United States Patent
Onal et al.

(10) Patent No.: US 9,857,245 B2
(45) Date of Patent: Jan. 2, 2018

(54) SOFT-BODY DEFORMATION AND FORCE SENSING

(71) Applicant: Worcester Polytechnic Institute, Worcester, MA (US)

(72) Inventors: Cagdas D. Onal, Allston, MA (US); Selim Ozel, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 15/064,872

(22) Filed: Mar. 9, 2016

(65) Prior Publication Data
US 2016/0265985 A1    Sep. 15, 2016

Related U.S. Application Data

(60) Provisional application No. 62/130,071, filed on Mar. 9, 2015.

(51) Int. Cl.
*G01L 1/12* (2006.01)
*B25J 13/08* (2006.01)
(Continued)

(52) U.S. Cl.
CPC .............. *G01L 1/122* (2013.01); *B25J 13/088* (2013.01); *B25J 15/12* (2013.01); *G01L 5/226* (2013.01); *Y10S 901/46* (2013.01)

(58) Field of Classification Search
CPC ... G01L 1/04; G01L 1/14; G01L 1/122; G01L 5/226; G01L 1/10; G01L 1/12;
(Continued)

(56) References Cited

U.S. PATENT DOCUMENTS

| 3,419,798 | A | | 12/1968 | Walton | |
|---|---|---|---|---|---|
| 5,691,637 | A | * | 11/1997 | Oswald | G01B 7/14 324/207.2 |

(Continued)

FOREIGN PATENT DOCUMENTS

| EP | 0136466 A1 | 4/1985 |
|---|---|---|
| RU | 2306536 C1 | 9/2007 |

OTHER PUBLICATIONS

Notification of Transmittal of the International Search Report and the Written Opinion of the International Search Authority for PCT/US2016/021457, "Soft-Body Deformation and Force Sensing", dated May 26, 2016.
(Continued)

*Primary Examiner* — Lisa Caputo
*Assistant Examiner* — Octavia Hollington
(74) *Attorney, Agent, or Firm* — Chapin IP Law, LLC (57) ABSTRACT

A robotic sensing and touch apparatus detects gradual deformations in a resilient surface, in contrast to conventional rigid member displacement. Hall effect sensors coupled to rare-earth magnets in a deformable base allow sensing of surface curvature and compression against grasped objects. The deformable base, such as a silicone mold or other resilient encapsulation, fixes a magnetic source and an opposed Hall effect sensor. Calibration of a received magnetic field is defined by a sensor element voltage in an "at rest" (undeformed) state, and at successive degrees of deformation resulting from compression of the deformable base that draws the magnet in different orientations relative to the Hall effect sensor. An array of magnet and sensor element pairs allows relative sensing over an area for detecting curvature of a translated or articulated member, or engagement with a curved surface.

18 Claims, 5 Drawing Sheets

(51) Int. Cl.
*B25J 15/12* (2006.01)
*G01L 5/22* (2006.01)

(58) Field of Classification Search
CPC ... G01B 7/14; G01B 7/004; G01B 7/30; B25J 13/088; B25J 15/12
USPC .................................................. 73/862.625
See application file for complete search history.

(56) References Cited

U.S. PATENT DOCUMENTS

| | | | |
|---|---|---|---|
| 6,389,187 B1 | 5/2002 | Greenaway et al. | |
| 8,978,488 B2 * | 3/2015 | Sato .......................... | G01L 1/14 73/862.625 |
| 9,182,459 B2 * | 11/2015 | Kalathil ................... | G01D 5/06 |
| 9,207,100 B2 * | 12/2015 | Frachon ................. | G01D 5/145 |
| 2003/0140713 A1 | 7/2003 | Ohsato et al. | |
| 2010/0175487 A1 | 7/2010 | Sato | |
| 2013/0015845 A1 * | 1/2013 | Fox ........................ | G01D 5/145 324/207.21 |

OTHER PUBLICATIONS

Majidi, et al., "A non-differential elastomer curvature sensor for softer-than-skin electronics," Smart Mater. Struct. 20 (2011) 105017 (8pp).
Park, et al., "Hyperelastic pressure sensing with a liquid-embedded elastomer," J. Micromech. Microeng. 20 (2010) 125029 (6pp).

* cited by examiner

SOFT-BODY DEFORMATION AND FORCE SENSING

RELATED APPLICATIONS

This application claims the benefit under 35 U.S.C. §119 (e) of U.S. Provisional Patent Application No. 62/130,071, filed Mar. 9, 2015, entitled "SOFT-BODY DEFORMATION AND FORCE SENSING," incorporated herein by reference in entirety

BACKGROUND

Robotic elements employ sensing mechanisms for determining a position of a robotic member in relation to other robotic members or external objects, such as an object grasped or contacted by the robotic member. Robotic members are typically actuated by electrical, hydraulic or pneumatic sources for movement. A robotic element may employ a plurality of independently movable robotic members, for example robotic appendages based on humanoid features such as arms, fingers and legs. Sensing mechanisms provide an indication of robotic member position for guiding continued actuation and control of the robotic member.

SUMMARY

Conventional robotic members are defined by rigid elongations disposed by a combination of linear and rotational movements. However, robotic movement may also be applied in terms of curvature and deformation of a soft or resilient material. Robotic movement applied to deformable, or "soft" members may not be well modeled by conventional linear or arcuate translations based on translation of substantially rigid, non-yielding structures.

A robotic sensing and touch apparatus detects gradual deformations in a resilient surface, in contrast to conventional rigid member displacement. Hall effect sensors coupled to rare-earth permanent magnets in a deformable base allow sensing of surface curvature and compression against grasped objects. Other uses and applications using modeling and detection of magnetic flux density received by a Hall effect or other magnetic sensor may be employed. The deformable base, such as a silicone rubber mold or other resilient encapsulation, fixes a magnetic source and an opposed Hall effect sensor. Calibration of a received magnetic field is defined by a sensor element voltage in an "at rest" (undeformed) state, and at successive degrees of deformation resulting from compression of the deformable base that draws the magnet closer to the Hall effect sensor or causes any other repeatable motion of the magnet with respect to the Hall element. An array of magnet and sensor element pairs allows relative sensing over an area for detecting curvature of a translated or articulated member, or engagement with a curved surface. Calibrated voltages taken from various degrees of deformation allow computation of positional displacement of a robotic member or grasping force against an engaged object.

In contrast, conventional approaches to sensing deformations and stresses rely on strain measurements of a sensing element. Fiber optic systems provide advanced accuracy and dynamic response, but require bulky signal conditioning units, making it difficult to integrate in a compact embedded package. Strain gauges are typically resistive, subject to drift and other dynamic artefacts, due to material response. Another strain-based resistive sensing approach uses liquid metals in embedded fluidic channels, relying on the change in channel dimensions under material strain. Electromechanical approaches including piezoelectric approaches for variable resistance are also prone to sensitivity drift.

Configurations herein are based, in part, on the observation that automated sensing capability is often employed in mechanized contexts such as robotics, manufacturing, pharmaceuticals and order fulfillment for sensing and manipulating of objects such as assembly parts, medication counts and inventory stock selection. Unfortunately, conventional approaches suffer from the shortcoming of accuracy and control, as physical contact must usually be made to detect an object, and imprecise forces can damage the object so sensed.

In conventional robotics, for example, rigid articulated members employ a combination of rotary pivots and linear elongations to arrive at precise positioning information due to the low tolerance of these rigid members. Achieving a fine line between effective actuation and finer "grasping" force can be challenging, as systems must be tuned to differentiate between moving heavy machinery and a fragile glass vial, for example. Accordingly, configurations herein substantially overcome these deficiencies by employing a soft bodied force sensor based on resilient materials and curvature positioning that can compute positioning by deformation of a resilient base relative to the object or position so sought. Movements of a deformable or articulated member are computed based on a curvature of a member using the soft bodied force sensor that employs a compressible substrate, or base, for positioning an array of Hall effect sensors and opposed magnets on the substrate for sensing relative compressive forces defined by the distance between the sensors and magnets. Movement of a curving or articulated member are received as a change in a "soft" surface as detected by the compressible base, rather than conventional linear and arcuate translations as with rigid members.

So-called "soft robotic" approaches include sensing apparatus for curvature and force, for example, and other robotic movements. Conventional approaches include strain gauges, which rely on surface deformation and may need require substantial force; piezoelectric, which can be prone to drift and varied responses; and fluidic, which tends to incur a delay resulting from fluid propagation. In contrast, magnetic flux density emitted from a magnetic source tends to remain consistent.

Movements of a robotic member or other body may then be characterized by bending deformation of soft segments as curvatures instead of discrete angles. Thus, the orientation and position of each point on a continuously deformable segment is uniquely defined with respect to its curvature. Robotic configuration is then modeled as a kinematic chain of segments, where each segment is defined by a single curvature value.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

FIG. 3a is a perspective phantom view of a frame mounting for the position sensor assembly as in FIG. 2a;

FIG. 3b is an assembled view of the position sensor assembly of FIG. 2a;

FIG. 3c is an exploded view of the position sensor assembly of FIG. 2a;

FIG. 4a is a multiple sensor configuration using multiple position sensor assemblies as in FIG. 2a;

FIG. 5 shows a sensor array configuration employing a frame mounting as in FIG. 3a with a plurality of sensors as in FIG. 4a.

DETAILED DESCRIPTION

The deformable soft body modeling and detection approach disclosed herein relies on measurement of a magnetic field, or magnetic flux density at a Hall effect sensor. Magnetic field density changes in deterministic fashion as a magnetic source is disposed near the Hall effect or other suitable magnetic sensor. Magnetic field density is generally consistent as the magnetic field emitted from a rare earth magnet is not prone to drift or degradation during regular use. Disposing a magnet and a Hall effect sensor in an opposed relation through a resilient, deformable material allows the curvature or compression of the deformable material to result in corresponding changes to the magnetic flux density as received by the Hall effect sensor. Computation and calibration of the magnetic field at a particular position of the magnetic source relative to the Hall effect sensor element allows a deterministic measurement by the sensor element for identifying a position of the magnet, and a corresponding deformation or curve of the mounting material. Multiple magnet-sensor pairs may define an array for detecting a longer curvature of a linear member or relative compression of an area for contacting or grasping an irregular or curved surface.

Configurations herein depict a sensor apparatus including a magnetic field sense element disposed on a sensing assembly, and a magnetic source disposed on the sensing assembly and distal from the magnetic field sense element. The magnetic source is disposed to induce a non-contact response in the magnetic field sense element adjacent to or forced by a sensed object. In a particular configuration, the magnetic field sense element is a Hall effect sensor. The resulting apparatus offers a compact and non-contact sensing method that offers high accuracy and improved dynamic response.

Figure 1A:
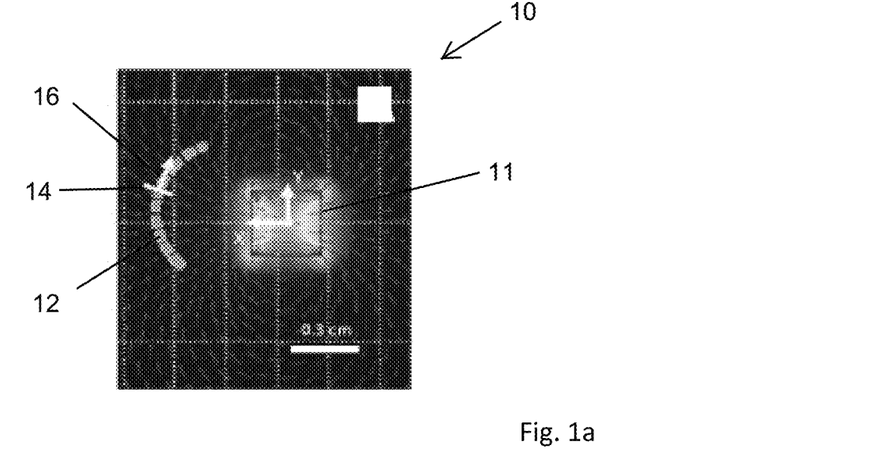
FIGS. 1a-1c show a context diagram of a sensing environment for soft bodied sensing suitable for use with configurations herein.
Figure 1B:
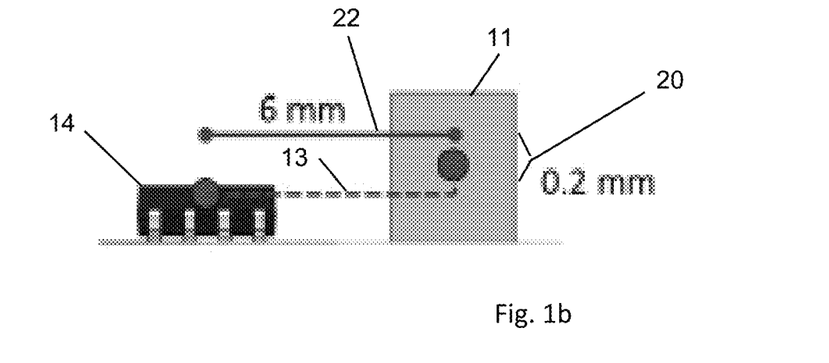
Figure 1C:
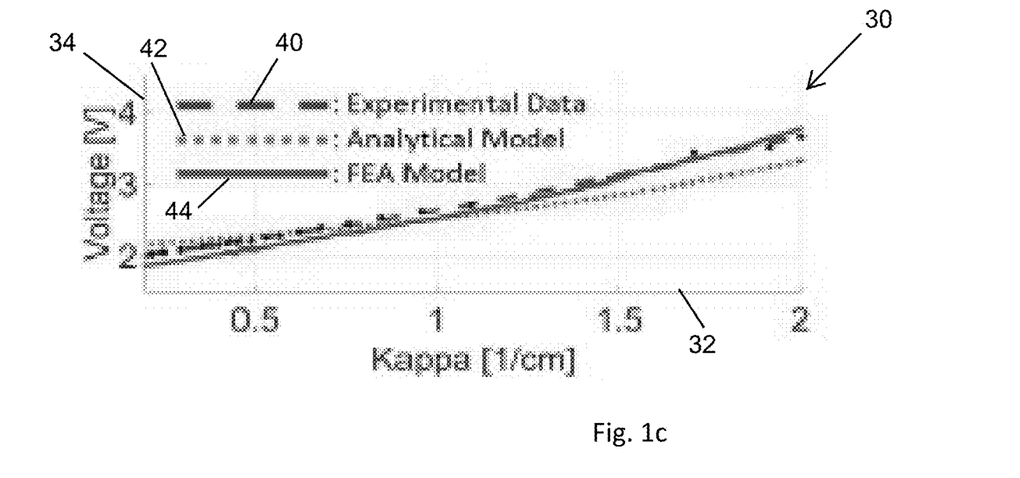

FIG. 1 shows a context diagram of a sensing environment 10 for soft bodied sensing as disclosed herein. Referring to FIGS. 1a-1c, FIG. 1a shows finite element analysis (FEA) data obtained from a simulation of sensor motion. A magnetic source, such as a rare earth magnet 11, generates a field of magnetic flux in an x and y dimension around the sensing environment 10 within range of a magnetic sensor 14, such as a Hall effect sensor. A dashed curve 12 shows the trajectory of a sensor 14 with curvatures ranging from −1.5 cm$^{-1}$ to 1.5 cm$^{-1}$. Arrow 16 indicates the sensing direction that is generally tangential to the trajectory. An inherent offset 20 due to vertical level difference between magnet 11 and sensing surface 14 can also be observed from the mid-point of the trajectory. FIG. 1b shows the vertical 20 and a horizontal offset 22 between the magnet 11 and the sensor 14. FIG. 1c shows a graph 30 of sensed magnetic flux density vector magnitude computed between 0.5 cm.$^{-1}$ and 2.0 cm.$^{-1}$ on a horizontal axis 32. The dashed curve 40 is a least squares fit obtained from voltage measurements (vertical axis 34) from different curvatures. The solid curve 44 is the voltage versus curvature result from the FEA simulation. The dotted curve 42 is a simulation result obtained from the theoretical model between 0.5 cm.$^{-1}$ and 2.0 cm.$^{-1}$. Both in simulations and in application, the example magnet 11 is a cube magnet with a side length of 3 mm. The magnetization value for simulations is 8.0×10$^5$ A/m.

Figure 2A:
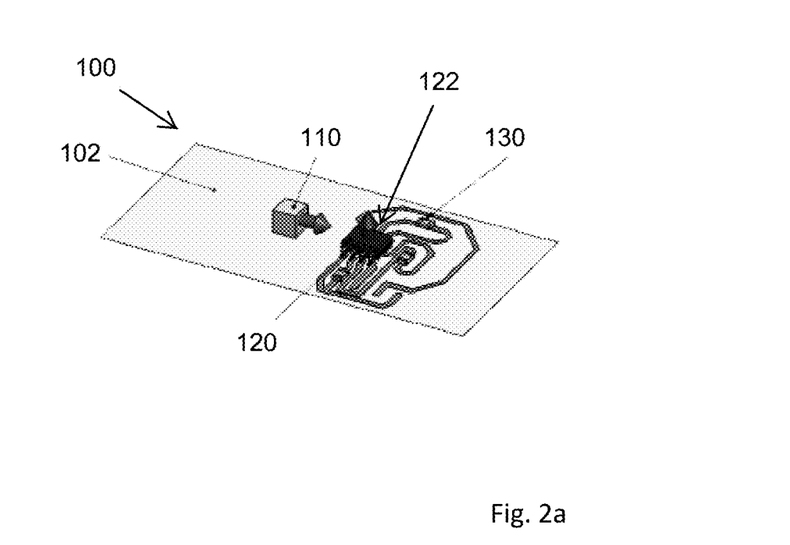
FIG. 2a is a perspective view of the position sensor assembly as disclosed herein.

FIG. 2a is a perspective view of the position sensor assembly 100 as disclosed herein. Referring to FIG. 1a, a flexible substrate defines a resilient base 102 for a magnetic source 110 and a sense element 120. In the example arrangement, the magnetic source 110 is a neodymium magnet and the sense element 120 is a Hall effect sensor positioned for responsiveness to a magnetic field from the neodymium magnet, however other arrangements of magnetic sources and sense elements may be employed, such as electromagnets and/or other forms of permanent magnets. Positioning logic 130 connects to the sense element 120 for receiving electromagnetic field strength and computing positioning information, and includes a power source such as a lithium battery for activating the sense element 120.

The flexible substrate may comprise a robotic appendage or articulated member responsive to external actuation. In response, the resilient base 102 deforms such that the magnetic source 110 is disposed at different angles and distances from a sensing surface 122 of the sense element 120, resulting in the positioning logic 130 receiving different voltage characteristics from the sense element 120. The activated sense element 120, connected to the positioning logic 130, responds with voltage characteristics detectable by the positioning logic 130, such as whether the magnetic source is moving closer or farther, or up and down with respect to a plane of the sense element 130.

In the example configuration as disclosed, the method of detecting position therefore includes disposing a magnetic source 110 on a deformable, resilient base 102 adapted for response to a force, in which the magnetic source 110 is in communication with a moving structure such as a robotic member for which positioning information is sought. The method detects, at the sense element 120 a magnetic field from the magnetic source 110 which is indicative of displacement of the magnetic source 110 resulting from deformation of the base 102. Accordingly, the sense element 120 generates voltage characteristics based on the magnetic field. The positioning logic 130 computes, based on the voltage characteristics, a position of the disposed magnetic source for computing and extrapolating a position of the moving structure.

Positioning logic 130, which may be external to the assembly 302, compares the voltage characteristics from each sense element 120 of the plurality of sense elements. Observed voltage characteristics are used for calibrating the received voltage characteristics to the disposed positions of the magnetic source 110 for generating a correlation of voltage characteristics to the position. Subsequent usage results in deterministic voltage characteristics that correlate with the calibrated voltage characteristics to compute position.

Figure 2B:
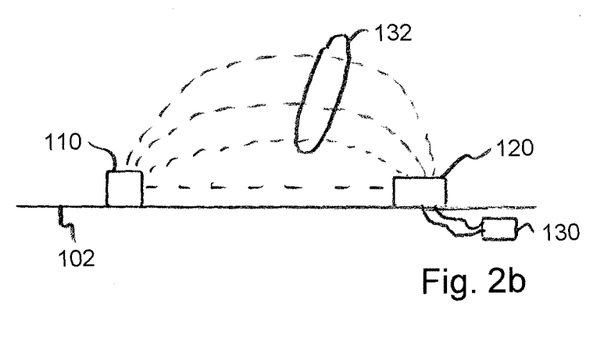
FIG. 2b is a side view of the position sensor assembly in FIG. 1 at a rest position.

FIG. 2b is a side view of the position sensor assembly 100 in FIG. 2a at a rest position. The resilient base 102 takes a substantially planar form as the magnetic source 110 aligns substantially with a plane of the sense element 120. The magnetic source 110 has a rest position defined by a magnetic axis perpendicular to a sensing direction of the sense element 120, and the calibration procedure distinguishes the disposed positions relative to the rest position, such that the deformable base is undeformed in the rest position. Any suitable position arrangement may be employed to denote the relation of the magnetic source 110 to the sense element 120 at the rest position. The disclosed configuration employs an undeformed state of the base 102 as the rest position from which other positions are calculated from. The voltage characteristics received in the rest position correspond to positioning information 132 calibrated to that rest position based on the magnetic field density.

Figure 2C:
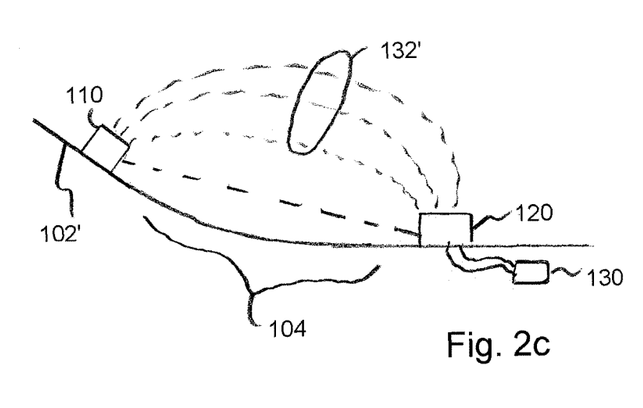
FIG. 2c is a side view of the position sensor assembly of FIG. 1 in a curved or deformed position.

FIG. 2c is a side view of the position sensor assembly of FIG. 1 in curved, or deformed position. The base 102 curves or bends around a region 104, which may also be defined by a more gradual curve of the substrate material, as when the substrate is attached to a robotic member. A new position defined by the curved base 102' results in different positioning information 132' due to the different distance and relative height from the sense element 120, resulting in a different magnetic flux density to be received at the sense element 120. The positioning logic 130 computes a curvature based on the deformation of the base 102' and, in the case of a robotic member, the moving structure on which the base is disposed. The positioning logic 130 determines a correlation between magnetic flux at the sense element 120 and curvature of the member, such that the curvature defines the position of the moving structure based on the position information 132' from the new position. In the example of FIG. 1c, the computed position defines a curvature or other articulation of the moving structure, as the articulation changes the distance and angular relation between the sense element 120 and the corresponding magnetic source 110 for affecting the voltage characteristics received by the positioning logic 130. The moving structure may be, for example, a robotic member responsive to positioning logic for attaining the computed position.

Figure 3A:
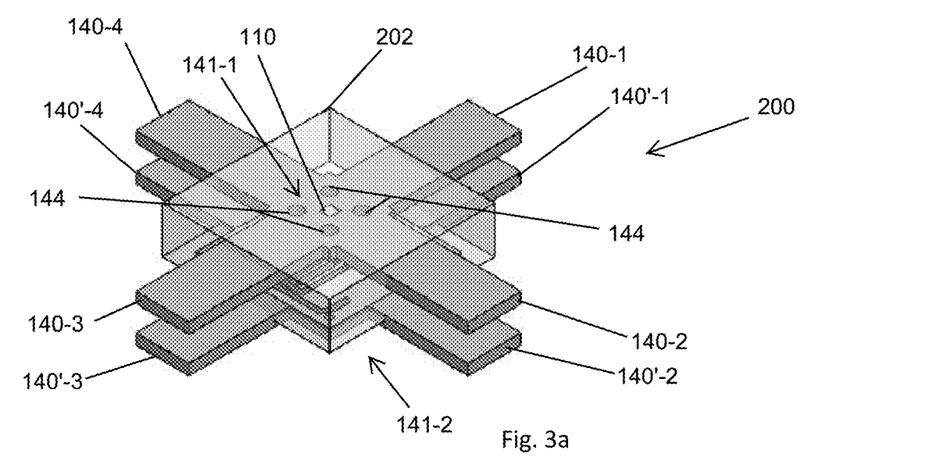

FIG. 3a is a perspective phantom view of a frame 200 mounting for the position sensor assembly as in FIG. 1a. In the example of FIG. 3a, a silicone base 202 houses the magnetic sources 110 and sense elements 120, such that the silicone base 202 compressively responds. In the case of a robotic armor appendage, the silicone base 202 deforms in response to a robotic member or other force for accommodating an articulation of the robotic member, in which the computed position is indicative of the articulation of the robotic member. Opposed elongated axial arms 140-1 . . . 140-4 (140 generally) and 140'-1 . . . 140'-4 (140' generally) define opposed pairs of arms extending from a central hub 141-1 . . . 141-2 (141 generally) for mounting the magnetic source 110 and sense element 120, respectively. Through holes 144 provide engagement with the silicone base 202 as it is formed around the arms 140.

Figure 3B:
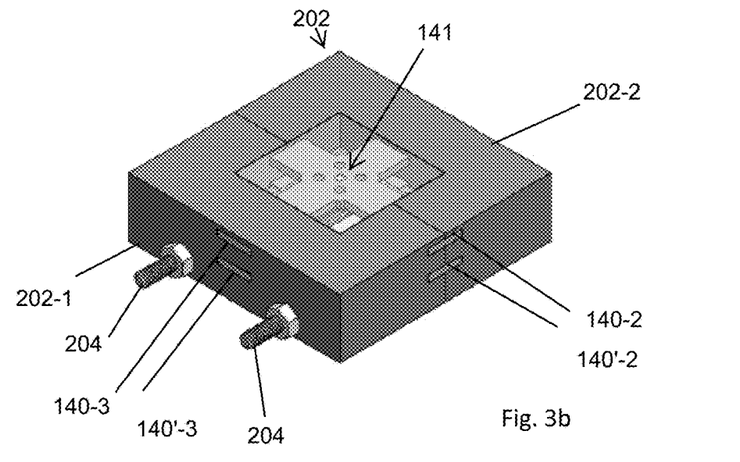

FIG. 3b is an assembled view of the position sensor assembly of FIG. 3a. The base 202 may comprise assembled halves 202-1, 202-2 surrounding the hub 141. Axial arms 140 may be truncated to correspond to the base 202 surface. Screws 204 or other attachments encapsulate the hub 141 and arms 140 with the magnetic source 110, sense element 120 and positioning logic 130; alternatively, the positioning logic may be separate and connected via tethers (e.g. wires) or wireless (e.g. WiFi, Bluetooth®) mechanisms.

Figure 3C:
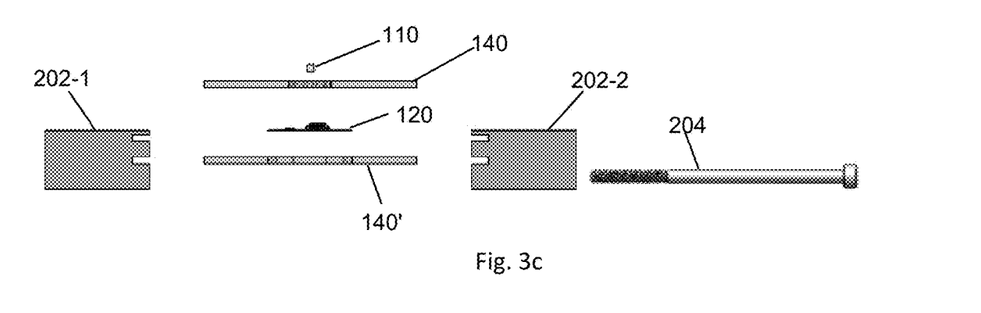
Figure 4A:
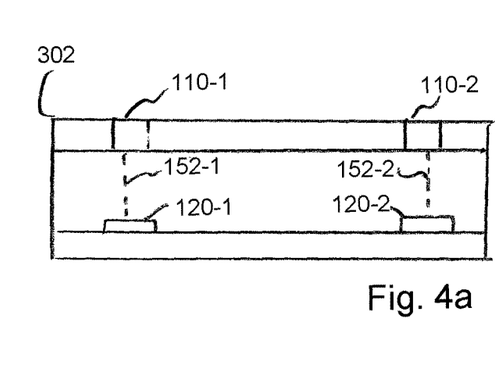

FIG. 3c is an exploded view of the position sensor assembly of FIG. 3a. Referring to FIGS. 3a-3c, upper arms 140 flank the upper hub 141-1 containing the magnetic source 110, and oppose lower hub 141-2 containing the sense element 120. Both upper 140 and lower 140' arms are engaged by halves of the base 201-1, 202-2 to define the encapsulated sensor assembly FIG. 4a is a multiple sensor configuration using multiple position sensor assemblies as in FIG. 2a. Referring to FIGS. 3a and 4a, the encapsulated base 202 may include multiple sense elements 120 and corresponding magnetic sources 110. The assembly of FIG. 3a disposes a plurality of magnetic sources 110-1 . . . 110-2 on the resilient base 302, such that each magnetic source 110 has a corresponding sense element 120-1 . . . 120-2. The base 202 may take a layered composition, such as a silicone or other deformable medium between the opposed hub 141 and arms 140 as in FIGS. 2a-2c, or may be a homogeneous resilient composition. Positioning logic 130, which may be external to the assembly 302, compares the voltage characteristics from each sense element 120 of the plurality of sense elements, and determines, based on the voltage characteristics, a distance from each of the magnetic sources 110-n to the corresponding sense element 120-n, such that the distance results from deformation of the base in response to the force. Depending on the magnitude of the force at varying locations, the positioning logic computes, based on the relative distances and arrangement of each of the magnetic sources, the position of the moving structure or other bearing force on the assembly 302.

Figure 4B:
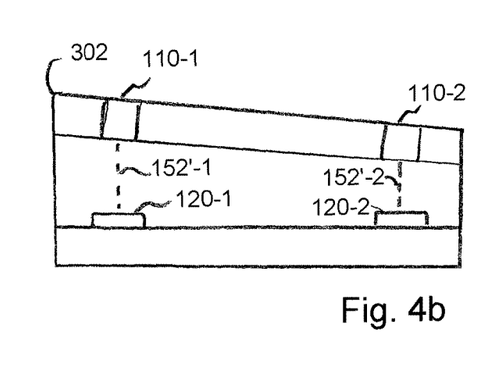
FIG. 4b shows the sensor configuration of FIG. 3a in a deformed state due to an external force.

FIG. 4b shows the sensor configuration of FIG. 4a in a deformed state due to an external force, shown by arrow 150. In a rest state or position as in FIG. 4a, each magnet (magnetic source) 110 is centered above the respective sense element 120, and the respective distances 152-1 . . . 152-2 are equal. As the force 150 drives the magnet 110-2 closer to the sense element 120-2, the distance 152'-2 becomes less than the distance 152'-1, and the sense element 120-2 yields a reading indicative of the increased sensed magnetic flux density.

Figure 5:
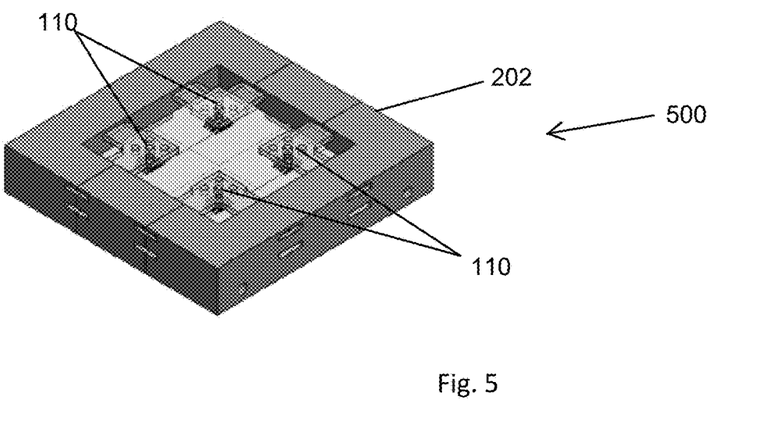

FIG. 5 shows a sensor array configuration employing a frame mounting as in FIG. 3a with a plurality of sense elements 120 as in FIG. 4a. The frame assembly 202 may thus comprise an array of sense elements 120, such that the array defines an ordered arrangement of sense elements 120 at predetermined spacing along a common plane on the deformable base 202, such that each magnetic source 110 has an opposed sense element 120 disposed on a parallel plane when the deformable base is in an undeformed state. A 2×2 array of sensors is shown in a square formation, however any suitable arrangement or density may be employed. Computation of the relative position of the magnet occurs as the base 202 material deforms. Alternate configurations employ a 3 dimensional Hall effect sensor, which can also compute displacement and deformation resulting from shear forces, discussed further below. An array configuration may be employed, for example, in a sensor for detecting a grasp on an annular surface such as a glass vial for ensuring a sufficient grip without breaking or crushing. Another alternate configuration may be a synthetic skin or flexible garment or suit.

In an example configuration, the array may define a layered soft touch force sensor sheet, including a magnetic source layer defining a position of each of a plurality of magnetic forces, and a sense element layer substantially parallel to the magnetic source layer, such that the sense element layer defines a plurality of sense elements 120, and each sense element is opposed to a corresponding magnetic source 110. A deformable base layer is layered between the magnetic source layers and sense element layers for disposing the magnetic source elements at a predetermined distance from the corresponding sense element, in which each of the sense elements includes a Hall effect sensor. Each of the sense elements is configured for sensing a magnetic field from the corresponding magnet, such that the sensed magnetic field is indicative of displacement of the magnetic source resulting from deformation of the base 202. A power source such as a lithium battery connects to each of the sense elements and adapted to induce voltage characteristics based on the sensed magnetic field, and positioning logic 130 is responsive to the induced voltage for computing, based on the voltage characteristics, a position of each of the magnetic sources relative to the corresponding sense element. Positioning logic 130 may be coupled directly, through the power supply voltage, or wirelessly to each of the sense elements, such as by Bluetooth®, Zigbee® or WiFi.

Measurements obtained from the sense elements define positioning data may be employed based on the computed and calibrated readings of magnetic flux density, as follows. Theoretical modeling of magnetic flux density vectors around a magnet provides intuition on the curvature sensor response. A simple dipole model of magnetism approximates these vectors, but it does not include volumetric constraints. Cartesian magnetic field vector components in the magnet frame can be written as:

$$B_x(x,y) = \frac{\mu_0 M_s}{2\pi}\left(\arctan\frac{2h(x+w)}{(x+w)^2+y^2-h^2} - \arctan\frac{2h(x-w)}{(x-w)^2+y^2-h^2}\right)$$

$$B_y(x,y) = \frac{\mu_0 M_s}{4\pi}\left(\ln\frac{(x+w)^2+(y-h)^2}{(x+w)^2+(y+h)^2} - \ln\frac{(x-w)^2+(y-h)^2}{(x-w)^2+(y+h)^2}\right).$$

In the equations above, $B_x$ and $B_y$ are magnetic flux density vector components in different (x; y) positions with respect to the magnet. X-axis and Y-axis are parallel to horizontal and vertical lines respectively, and origin of the magnet frame is attached to the middle of the cube magnet. $\mu_0$ is the relative magnetic permeability of the medium. $M_x$ is the surface magnetization magnitude of the magnet. Finally, h and w are the height and width of the rectangular magnet. The grid-matrix is used as reference in a simulation which outputs curvature values. Positions of the magnet and sensor pair in the simulations are computed using:

$$X_i = \frac{1}{\kappa_i}\sin(\kappa_i s),$$

$$Y_i = \frac{1}{\kappa_i}(1 - \cos(\kappa_i s))$$

The position of any point on the curve can be determined using $X_i$ and $Y_i$. The letter i denotes the number of the segment in the chain, for generality. $\kappa_i$ is the curvature of segment i and s is the arc-length (i.e. non-dimensional position of the point on the segment). These positions are unitless, and may be multiplied with the actual length of the segment to compute dimensional positions. Coordinate frames are attached to the sensor and the magnet in simulations. Orientation of the sensor frame with respect to the magnet frame can be associated to the current curvature value using the following relation:

$$R_s^m = \begin{bmatrix} \cos(\kappa(s_m - s_s)) & -\sin(\kappa(s_m - s_s)) & 0 \\ \sin(\kappa(s_m - s_s)) & \cos(\kappa(s_m - s_s)) & 0 \\ 0 & 0 & 1 \end{bmatrix}$$

where $s_m$ and $s_i$ are non-dimensional positions of the magnet and the hall-effect sensor on the segment. Since magnetic flux vectors obtained are in the magnet frame $B^m{}_m$, they need to be converted to the sensor frame $B^s{}_m$ using the rotation matrix above. Afterwards, the position data can be used on the grid-matrix to obtain the magnetic flux density vector on the sensor.

Distance from each of a plurality of magnets to the corresponding sense element provides a relative value of each point so sensed. The calculated distance between the sensor and the magnet can be found using:

$$B_z(z) = \frac{\mu_0 M_s}{4\pi}\left[\frac{z+l/2}{\sqrt{(z+l/2)^2+r^2}} - \frac{z-l/2}{\sqrt{(z-l/2)^2+r^2}}\right]$$

In the above equation, l and r are thickness and radius of parameters of a cylindrical magnet. They are both 0.8 mm in the disclosed approach. $\mu_0$ is the relative permeability in the air. M is the surface magnetization value of the magnet and it is selected as $1.6\times10^4$ A/m to replicate the magnetic field curves provided by the vendor. The distance between the sensor surface and the magnet surface is approximately 3 mm.

As robots are becoming increasingly integrated with human behavior, they will need complex and specialized sensory systems. One of these areas is tactile sensing for direct contact and force measurement from the robot body. Scalable and precise sensing solutions are needed in this context. In the approach disclosed above, mechanical and electronic design details of two instantiations of soft-bodied force and tactile sensors are discussed.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of detecting position, comprising:
   disposing a magnetic source on a deformable, resilient base adapted for response to a force, the magnetic source in communication with a moving structure for which positioning information is sought;
   detecting, at a plurality of coplanar magnetic sense elements, a magnetic field from the magnetic source and indicative of displacement of the disposed magnetic source resulting from deformation of the base, the deformable base being continuous between the sense elements and the magnetic source for defining a common predetermined distance in an undeformed state;
   generating, by the sense element, voltage characteristics based on the magnetic field; and
   computing, based on the voltage characteristics, a position of the disposed magnetic source for extrapolating a position of the moving structure.

2. The method of claim 1 further comprising calibrating received voltage characteristics to the disposed positions of the magnetic source for generating a correlation of voltage characteristics to the position.

3. The method of claim 2 wherein the magnetic source has a rest position defined by a magnetic axis perpendicular to a sensing direction of the sense element, further comprising calibrating the disposed positions relative to the rest position, the deformable base being undeformed in the rest position.

4. The method of claim 3 further comprising:
identifying a curvature based on the deformation of the base and the moving structure on which the base is disposed;
determining a correlation between magnetic flux at the sense element and curvature of the member, the curvature defining the position of the moving structure.

5. The method of claim 3 further comprising:
identifying a curvature based on the deformation of the base and the moving structure on which the base is disposed;
determining a correlation between magnetic flux at the sense element and curvature of the member, the curvature defining the position of the moving structure.

6. The method of claim 1 wherein the computed position occurs independent of physical contact between the sense element and the magnetic source.

7. The method of claim 1 wherein the magnetic source is a neodymium magnet and the sense element is a Hall effect sensor positioned for responsiveness to a magnetic field from the neodymium magnet.

8. A method of detecting position, comprising:
disposing a plurality of magnetic sources on a deformable resilient base adapted for response to a force, the magnetic sources in communication with a moving structure for which positioning information is sought, each magnetic source having a corresponding sense element;
detecting at a sense element, a magnetic field from the magnetic source and indicative of displacement of the disposed magnetic source resulting from deformation of the base;
generating, by the sense element, voltage characteristics based on the magnetic field; and
comparing the voltage characteristics from each sense element of the plurality of sense elements;
determining, based on the voltage characteristics, a distance from each of the magnetic sources to the corresponding sense element, the distance resulting from deformation of the base in response to the force; and
computing, based on the relative distances and arrangement of each of the magnetic sources, the position of the moving structure, including computing, based on the voltage characteristics, a position of the disposed magnetic source for extrapolating a position of the moving structure.

9. The method of claim 8 further comprising an array of sense elements, the array defining an ordered arrangement of sense elements at predetermined spacing along a common plane on the deformable base, each magnetic source having an opposed sense element disposed on a parallel plane when the deformable base is in an undeformed state.

10. The method of claim 8 wherein the computed position defines an articulation of the moving structure, the articulation changing the distance between at least one of the sense elements and the corresponding magnetic source for affecting the voltage characteristics.

11. The method of claim 8 wherein the moving structure is a robotic member responsive to positioning logic for attaining the computed position further comprising providing a silicone base for housing the magnetic sources and sense elements, the silicone base compressively responsive to the robotic member for accommodating an articulation of the robotic member, the computed position indicative of the articulation of the robotic member.

12. A position sense apparatus, comprising:
a deformable, resilient base adapted for response to a force;
a magnetic source disposed on the base;
a plurality of coplanar sense elements disposed distally on the base, each of the sense elements configured for sensing a magnetic field from the magnetic source and indicative of displacement of the magnetic source resulting from deformation of the base,
a power source connected to the sense element and adapted to induce voltage characteristics based on the sensed magnetic field; and
positioning logic responsive to the induced voltage for computing, based on the voltage characteristics, a position of the disposed magnetic source, the deformable base comprising a base material selectively responsive to external forces, the magnetic source and sense elements positioned with a distance of base material therebetween, wherein the magnetic source has a rest position defined by a magnetic axis perpendicular to a sensing direction of the sense elements, the sense elements responsive to calibration of the disposed positions relative to the rest position, the deformable base being undeformed in the rest position.

13. The apparatus of claim 12 further comprising a set of calibrated voltage characteristics indicative of the disposed positions of the magnetic source for generating a correlation of voltage characteristics to the position.

14. The method of claim 12 wherein the magnetic source is a neodymium magnet and the sense element is a Hall effect sensor positioned for responsiveness to a magnetic field from the neodymium magnet.

15. The method of claim 12 wherein each of the magnetic sense elements has a corresponding magnetic source disposed on the resilient base.

16. A position sense apparatus, comprising:
a deformable, resilient base adapted for response to a force;
a plurality of magnetic sources disposed on the deformable base, each magnetic source having a corresponding sense element disposed distally on the base, the sense element configured for sensing a magnetic field from the magnetic source and indicative of displacement of the magnetic source resulting from deformation of the base;
a power source connected to the sense element and adapted to induce voltage characteristics based on the sensed magnetic field; and
positioning logic responsive to the induced voltage for computing, based on the voltage characteristics, a position of the disposed magnetic source, wherein the positioning logic is further configured to:
compare the voltage characteristics from each sense element of the plurality of sense elements;
determine, based on the voltage characteristics, a distance from each of the magnetic sources to the corresponding sense element, the distance resulting from deformation of the base in response to the force; and
compute, based on the relative distances and arrangement of each of the magnetic sources, the position of the moving structure.

17. The method of claim 16 further comprising an array of sense elements, the array defining an ordered arrangement of sense elements at predetermined spacing along a common plane on the deformable base, each magnetic source having an opposed sense element disposed on a parallel plane when the deformable base is in an undeformed state.

18. A soft touch force sensor, comprising:
- a magnetic source layer defining a position of each of a plurality of magnetic forces;
- a sense element layer substantially parallel to the magnetic source layer, the sense element layer defining a plurality of sense elements, each sense element opposed to a corresponding magnetic source;
- a deformable base layer between the magnetic source layers and sense element layers for disposing the magnetic source elements at a predetermined distance from the corresponding sense element, each of the sense elements including a Hall effect sensor;
- each of the sense elements configured for sensing a magnetic field from the corresponding magnetic source, the sensed magnetic field indicative of displacement of the magnetic source resulting from deformation of the base,
- a power source connected to each of the sense elements and adapted to induce voltage characteristics based on the sensed magnetic field; and
- positioning logic responsive to the induced voltage for computing, based on the voltage characteristics, a position of each of the magnetic sources relative to the corresponding sense element.

* * * * *